Figure 5:
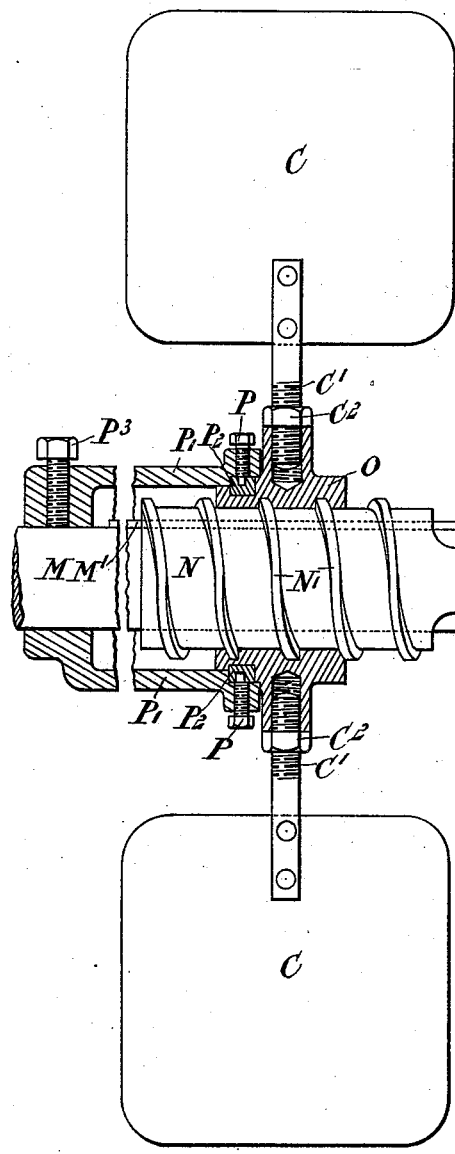

(No Model.) 2 Sheets—Sheet 1.
C. TUCKFIELD.
GOVERNOR FOR ENGINES.
No. 549,834. Patented Nov. 12, 1895.
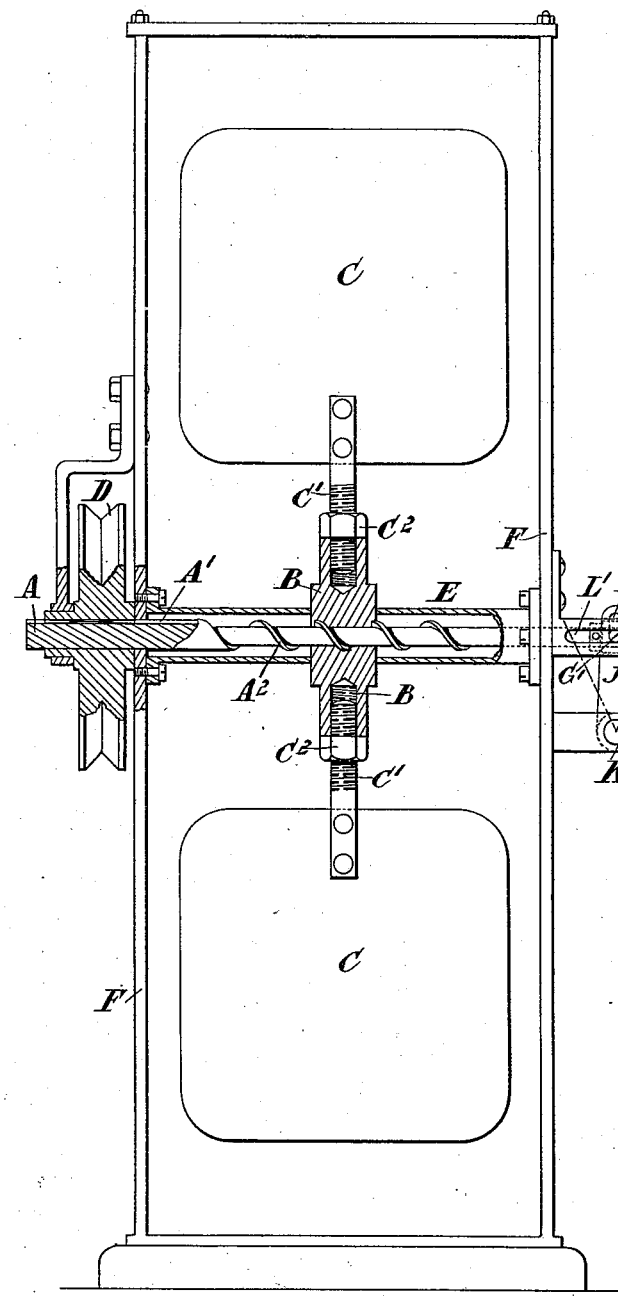
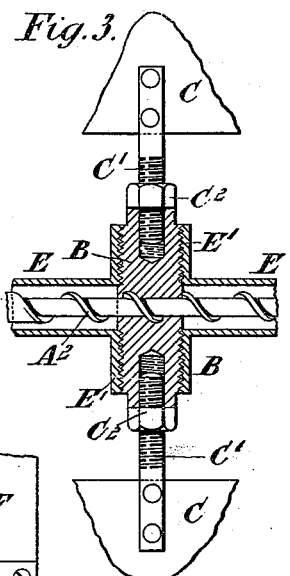
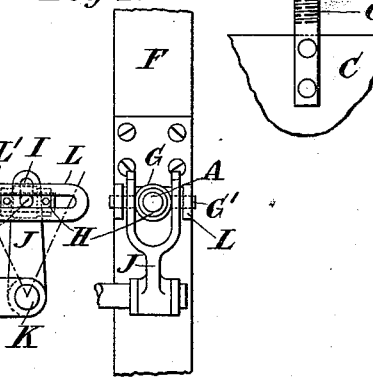
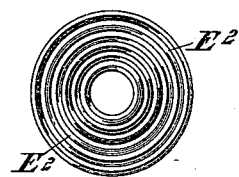
Witnesses:
Alvan Macauley
Thomas Durant
Inventor
Charles Tuckfield.
By
Church & Church,
His Attorneys.

(No Model.) 2 Sheets—Sheet 2.

C. TUCKFIELD.
GOVERNOR FOR ENGINES.

No. 549,834. Patented Nov. 12, 1895.

UNITED STATES PATENT OFFICE.

CHARLES TUCKFIELD, OF LONDON, ENGLAND.

GOVERNOR FOR ENGINES.

SPECIFICATION forming part of Letters Patent No. 549,834, dated November 12, 1895.

Application filed September 21, 1891. Serial No. 406,386. (No model.) Patented in England January 15, 1891, No. 784, and July 8, 1891, No. 11,623; in Belgium September 19, 1891, No. 96,451, and in France September 24, 1891, No. 216,327.

*To all whom it may concern:*

Be it known that I, CHARLES TUCKFIELD, a subject of the Queen of England, at present residing at Hounslow, London, England, have invented certain new and useful Improvements in Governors for Engines, (for which I have obtained Letters Patent in Great Britain, No. 11,623, dated July 8, 1891, and No. 784, dated January 15, 1891; in France, No. 216,327, dated September 24, 1891, and in Belgium, No. 96,451, dated September 19, 1891,) of which the following is a specification.

This invention is applicable to steam and other engines, windmills, turbines, and other motive-power engines and may be carried out as follows: Upon a shaft is a screw-thread with which engages a nut carrying vanes adapted to operate in the air or other suitable fluid. The fan which is employed may be a special one appertaining to the governor, or where an existing ventilating or other fan, centrifugal pump, or the like is available such fan or pump, may be used in place of the special fan. The nut is so arranged that it cannot travel to any appreciable extent upon the shaft, but can merely revolve upon it or allow the shaft to revolve within it, so that the longitudinal motion due to the screw-thread will be imparted to the shaft and not to the nut. In some cases it is desirable to employ plain or grooved friction-disks or equivalent to increase the friction between the nut and the shaft. The shaft is driven in any convenient manner from or by the motor-engine, and is so arranged as to have free longitudinal movement within the limits required. The shaft is connected with the throttle-valve or other controlling mechanism of the motor-engine.

In use the shaft is driven as above explained and carries the nut round with it so long as the friction between the two is not overcome. When this takes place, the nut will revolve more slowly than the shaft, which will then be caused to move longitudinally within the nut by the operation of the screw-thread, and in doing so closes the throttle-valve or otherwise operates to control the engine. When the speed of the shaft becomes less than that of the nut, the latter will cause the former to travel longitudinally in a direction opposite to that which it formerly adopted.

Figure 6:
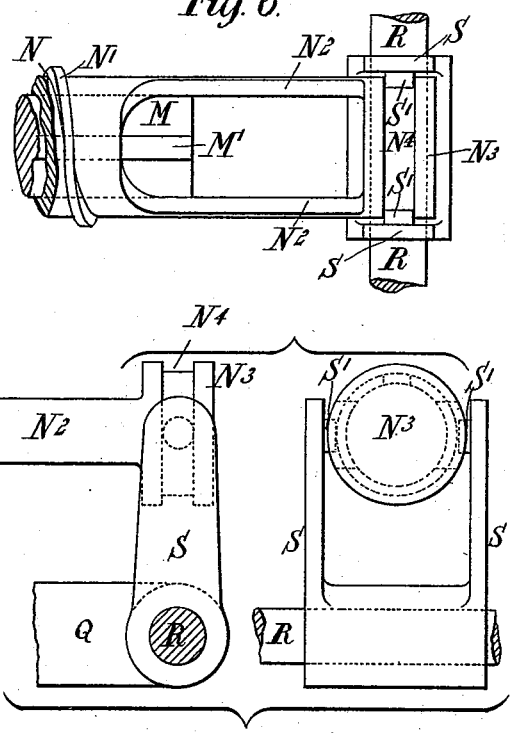

In the accompanying drawings, Figure 1 is an elevation partly in section of a governor constructed according to this invention, and Fig. 2 is an end elevation of the shaft and arm for taking off the motion from the governor. Fig. 3 is an elevation of part of a modified form of governor constructed according to this invention, and Fig. 4 is a face view of one form of the friction-disks thereof. Fig. 5 is an elevation partly in section of the apparatus applied directly upon the shaft of the motor to be governed, and Fig. 6 is a plan partly in section of mechanism by which the movement of the worm may be taken off.

Like letters indicate like parts throughout the drawings.

A is the shaft, screwed for a sufficient portion of its length $A^2$ and carrying the nut B, into which are screwed the vanes C by their spindles C', which may be locked in any required position by the lock-nuts $C^2$. Upon the shaft A is the pulley D, preferably having a keyway cut in it for the passage of the feather A', by which arrangement the pulley will carry the shaft round with it, but the shaft can reciprocate longitudinally through the pulley. This pulley D may be driven in any convenient manner from or by the motor which the governor is to control, or other suitable means may be employed for giving motion to the shaft A, the important feature being that the speed of A must vary with that of the motor to be controlled. The nut B is prevented from traveling along the worm $A^2$ by the tubes E, secured to the framing F, which carries the whole movable part of the apparatus.

The end of the shaft A remote from the pulley D is reduced and carries a sleeve G, which is prevented from escaping from the shaft by the collar H, secured upon the end of the shaft. The sleeve G carries the trunnions G', which pass through slots I in the jaws of the arm J, which may be carried upon the shaft K and the motion from that taken direct to the throttle-valve lever or utilized in any other convenient manner. Guides L are secured upon the framing and have slots L', in which the trunnions G' travel as the shaft reciprocates longitudinally. Any other suitable means may be employed for taking off the motion of the shaft A.

The operation of this apparatus is as follows: The shaft A is revolved by the pulley D and carries with it the nut B and vanes C, all these parts revolving together as a whole. When, however, the resistance of the vanes C, due to the speed at which they are traveling, overcomes the friction between the nut and the shaft, the latter travels faster than the nut and by the action of its screw-thread in the nut is projected forward longitudinally, imparting its movement to the throttle-valve or otherwise, as already explained. This movement closes the throttle-valve or otherwise reduces the speed of the motor to which the governor is applied, in consequence of which the shaft A revolves at a slower speed and the vanes, overtaking the shaft, return it to its normal position, or beyond, in which case the speed of the motor will be increased beyond the normal and the shaft will again overtake the vanes, and the same operations will be repeated again and again.

It will be seen that in this apparatus there is no connection between the screw and the nut other than that due to the friction between the two, whereas in previous apparatus of this description a spring connection has been established between these two parts, such spring representing the whole power available in the apparatus for use in controlling the motor. In the present apparatus, therefore, the power is only limited by the capacity of the vanes C and their friction with the atmosphere or other medium in which they work.

In employing this device as an electrical governor the movement of the shaft A may be so arranged as to make and break electrical circuits, the current being employed in any convenient manner, as by electromagnets, to effect the necessary operation.

In some cases it is desirable to load the nut to prevent the vanes from traveling too quickly, or to increase their power in causing the worm to travel, or even to dispense with the vanes altogether, and for this purpose I may employ friction-disks, either plain or grooved, such as indicated in Figs. 3 and 4. These disks E' are shown forming part of or connected with the tubes E, and where the annular ridges and grooves $E^2$ are employed the nut B will be similarly grooved to correspond. In many cases, however, plain faces upon the disks E' and the nut E will be sufficient for the purpose, and in some instances the friction-disks may be dispensed with altogether, as in the example shown in Fig. 1, their employment in either form depending upon the work to be performed.

Figs. 5 and 6 show means for applying this invention directly to the shaft of the motor. In these figures M represents the main or driving-shaft of the motor and N is a sleeve having a slotted keyway working upon the feather M', secured in the shaft M. This sleeve N carries the screw-thread N', and is adapted to travel longitudinally upon the shaft M. The nut O carries the vanes C, as before, and is prevented from traveling longitudinally by the bolts P, screwed through the sleeve-collar P' and into the split ring $P^2$, which works in a circumferential groove in the nut O. The sleeve-collar P' is secured upon the shaft M in any convenient manner, as by set-screws $P^3$. The sleeve N has projecting arms $N^2$, which carry a circular head $N^3$, having an annular groove $N^4$. In a bracket Q, projecting from any suitable fixed part of the apparatus, is carried a shaft R, upon which is fixed the fork or forked arms S, each member of which has a stud or projection S', which engages with the groove $N^4$ of collar $N^3$. The operation is substantially the same as that described in reference to Fig. 1, the sleeve in Fig. 5 taking the place of the shaft A in Fig. 1 and the movement being carried to the throttle-valve in any convenient manner from the shaft R, the arm S, or otherwise, as required. By this arrangement the governor can be applied directly to the shaft of the motor or to any intermediate shaft driven from the motor, so as to participate in the variations of speed of the motor.

I wish it to be understood that I am aware that governors embracing vanes, nut, and screw have before now been employed and that I make no general claim to such apparatus.

I claim—

1. In a motor governor, the combination with a motor controlling mechanism, a longitudinally movable threaded shaft rotated by the motor and operating the motor controlling mechanism by its longitudinal movement, of the threaded nut encircling the shaft, the bearings surrounding the shaft and preventing the movement of the nut longitudinally of the shaft, and the vanes mounted on the nut for retarding its rotation with the shaft; substantially as described.

2. In a governor for motors, the combination with the longitudinally movable screw shaft with motor controlling mechanism operated by such longitudinal movement, of the vaned nut loosely mounted on said shaft and the friction-disk cooperating with said nut to retard its rotation with the shaft; substantially as described.

3. In a governor for motors, the combination with the longitudinally movable screw shaft with motor controlling mechanism operated by such longitudinal movement, of the vaned nut loosely mounted on said shaft and the stationary friction disks on each side of said nut to prevent its movement longitudinally of the shaft and retard its rotation; substantially as described.

In testimony whereof I have hereto set my hand in the presence of the two subscribing witnesses.

CHARLES TUCKFIELD.

Witnesses:
HAROLD WADE,
CHAS. ROSE.